United States Patent
Manucy

(10) Patent No.: US 7,458,556 B1
(45) Date of Patent: Dec. 2, 2008

(54) VIBRATION ABSORPTION SYSTEM

(76) Inventor: Raymond Allen Manucy, 32 Tall Pines Rd., Suite A-1, West Palm Beach, FL (US) 33413

(*) Notice: Subject to any disclaimer, the term of this patent is extended or adjusted under 35 U.S.C. 154(b) by 0 days.

(21) Appl. No.: 11/871,355

(22) Filed: Oct. 12, 2007

(51) Int. Cl.
*F16M 9/00* (2006.01)

(52) U.S. Cl. ............ 248/676; 267/220; 267/284

(58) Field of Classification Search ......... 248/676, 248/677, 678, 638; 267/284, 220; 52/27; 62/297
See application file for complete search history.

(56) References Cited

U.S. PATENT DOCUMENTS

| | | | |
|---|---|---|---|
| 1,880,280 A | | 10/1932 | Replogle |
| 2,908,456 A | * | 10/1959 | Gertel ............... 248/566 |
| 3,198,324 A | | 8/1965 | Kallenback et al. |
| 3,223,400 A | | 12/1965 | Deister, Jr. |
| 3,721,106 A | | 3/1973 | Bierwirth et al. |
| 3,758,058 A | | 9/1973 | Neudeck et al. |
| 3,878,655 A | | 4/1975 | Toth et al. |
| 4,374,330 A | * | 2/1983 | Fey ............ 307/132 E |
| 4,598,503 A | | 7/1986 | Berger et al. |
| 4,810,003 A | * | 3/1989 | Pinch et al. ...... 280/124.155 |
| 5,467,971 A | * | 11/1995 | Hurtubise et al. ...... 267/220 |
| 6,079,698 A | | 6/2000 | Patterson et al. |
| 7,175,150 B2 | | 2/2007 | Chi |
| 2002/0113397 A1 | * | 8/2002 | Svensson et al. ...... 280/124.155 |
| 2005/0258331 A1 | * | 11/2005 | Chi ............... 248/638 |
| 2007/0034769 A1 | * | 2/2007 | Kwilosz ............ 248/565 |

FOREIGN PATENT DOCUMENTS

EP 336775 * 10/1989 ......... 267/220

* cited by examiner

*Primary Examiner*—Ramon O Ramirez
(74) *Attorney, Agent, or Firm*—Malin Haley DiMaggio Bowen & Lhota, PA

(57) ABSTRACT

A vibration, motion and dampening system is provided for use with air conditioning, mechanical or electro-mechanical equipment to reduce or eliminate the deleterious effects of vibration, movement and excessive noise created by the equipment. The system includes specially designed upper and lower channel frame members. The frame members receive geometrically compatible spring assemblies and plate members, as well as locking assemblies, wherein the assemblies are slidingly positioned with the frame members at desired locations. The spring assemblies and frame members receive and diminish the undesirable phenomena created by the equipment.

9 Claims, 3 Drawing Sheets

VIBRATION ABSORPTION SYSTEM

BACKGROUND OF THE INVENTION

1. Field of the Invention

The system described relates generally to a system for mounting an air conditioning unit. The system more particularly relates to a mounting system which absorbs vibration and movement, and dampens noise, of an air conditioning unit or similar equipment while in use.

2. Description of Related Art

There exists in the prior art devices which provide mounting for mechanical or electro-mechanical devices, such as air conditioning units. The prior art additionally provides structures which absorb vibration. An example of the prior art is found in U.S. Pat. No. 4,598,503 issued to Berger et al. on Jul. 8, 1986 entitled "Vibration Absorption Mounting For A Rooftop Air Handling Unit Or The Like". The Berger patent describes the use of a helical spring that can be either "placed or welded in place" on a cap.

U.S. Pat. No. 6,079,698 issued to Patterson et al. on Jun. 27, 2000 entitled "Isolation System For Vibratory Equipment" teaches an isolation suspension system for a vibrating machine having a housing holding an isolation spring and a damping element.

U.S. Pat. No. 7,175,150 issued to Chi on Feb. 13, 2007 entitled "Compound Vibration Damper Assembly" teaches a damping device having a vertical and horizontal damping unit. The vertical damping unit is an elastic element such as a coil spring. The horizontal dampening unit includes an elastomeric base plate, a horizontal vibration force damping member and an elastomeric top plate.

However, while the prior art generally addresses and describes devices which perform the function of damping vibration, Applicant's engineering designs provide superior and cost effective products. The prior art devices described do not address the particular problems solved by Applicant's inventions, do not provide the same or similar structure, do not provide the same solutions, and do not perform the same functions as that of the instant inventions and components thereof.

SUMMARY OF THE INVENTION

The instant inventions relate to a unique vibration absorption and dampening system which includes a top frame member, wherein the top frame has first and second horizontally extending channels. The vibration system further includes a bottom frame, wherein the bottom frame has a generally horizontally extending channel. The vibration system further includes at least one rubber plate that is slidably inserted into the first top frame channel. The rubber plate member can include an integral receptacle means which receives and retains a spring member as described hereinafter.

At the opposite end and lower unit, the system further includes at least one rubber plate slidably inserted into the bottom frame channel, wherein this second and lower rubber plate member also has a receptacle means for receiving and retaining the lower and second end of a spring member.

The vibration absorption system described and claimed herein incorporates at least one spring-like member or coil spring secured between coaxially aligned top and bottom frame channel members, and further between their respective rubber plate receptacle means. The unique channel designs of the frame members, and rubber or composite plastic plate members are a significant feature of the instant inventions. The base section of the plate members are slidingly positioned within the respective channel member. The plate members can include integral receptacle portions which protrude upwardly or downwardly, beyond the channel frame, to receive, retain and secure the spring member. The discrete components are generally coaxially aligned, complement one-another, and are assembled, positioned and secured in an efficient and relatively simple fashion.

The top frame and bottom frame members are, in one embodiment, secured to each other through separate mechanisms, spaced apart from spring assemblies. One securing mechanism includes at least one bolt and nut means, the bottom frame member can be mounted on top of an I-beam. The top frame member with its second horizontally extending channel receives mounting devices located on or about the base of an air conditioning unit as hereinafter described. The separate securing mechanisms can include plates on the outside of the frame members, or alternatively specially designed plates and nuts which slide within a portion of the channels and are secured therein. A third option incorporates a bolt and nut unit, or its equivalent, which is secured to the frame members within the spring assemblies and is likewise coaxially positioned therein.

It is therefore an object of the instant motion and vibration absorption system to provide an improved device and/or system for reducing the effects of vibration and movement created from an operable air conditioning unit, or similar mechanical or electro-mechanical device.

It is further an object of the instant invention to provide a motion and vibration absorption system which substantially reduces and dampens the noise created from an operable air conditioning unit, or similar mechanical or electro-mechanical device.

It is further an object of the instant invention to provide a motion and vibration absorption and dampening system which is cost effective to manufacture and assembly, and is operationally efficient.

In accordance with these and other features and objects which will become apparent hereinafter, the instant invention will now be described with particular reference to the accompanying drawings.

DETAILED DESCRIPTION

Figure 1:
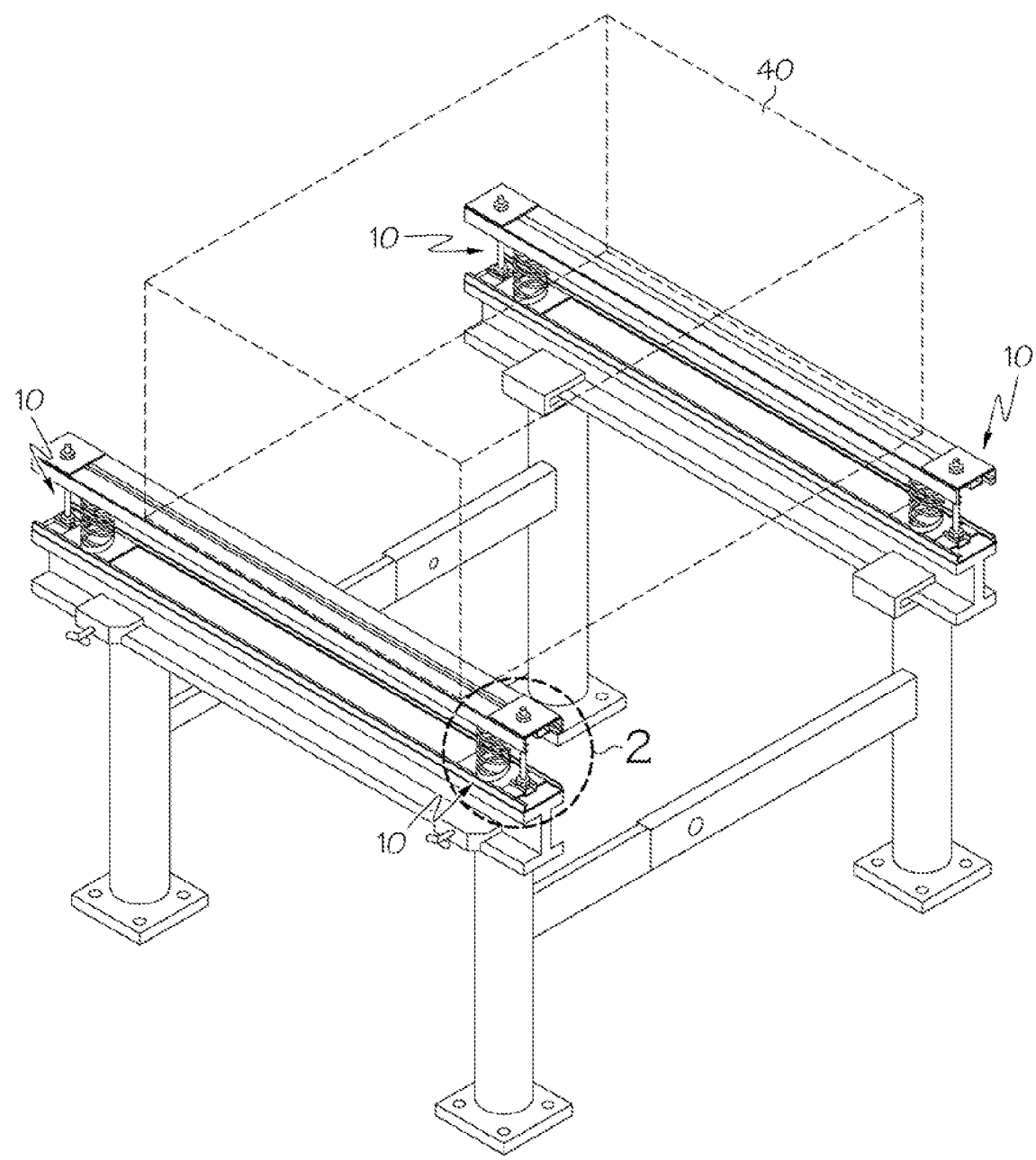
FIG. 1 shows a perspective view of the vibration absorption and dampening system assembled for use.

FIG. 1 illustrates a perspective view of the motion and vibration absorption and noise dampening system 10, assembled for in-use operation with the dashed line shape 40 representing an air conditioning unit. However, the instant inventions are equally applicable for use with other similar electro-mechanical or mechanical equipment which creates deleterious movement, vibration, loud noise or other unwanted phenomenon. Such equipment includes air handlers, condensers, compressors, fans, motors, generators, pumps or a variety of equipment used in commercial, industrial, residential or consumer applications.

As shown, it is contemplated that more than one vibration absorption system 10 may be used to support an air conditioning unit 40.

Figure 2:
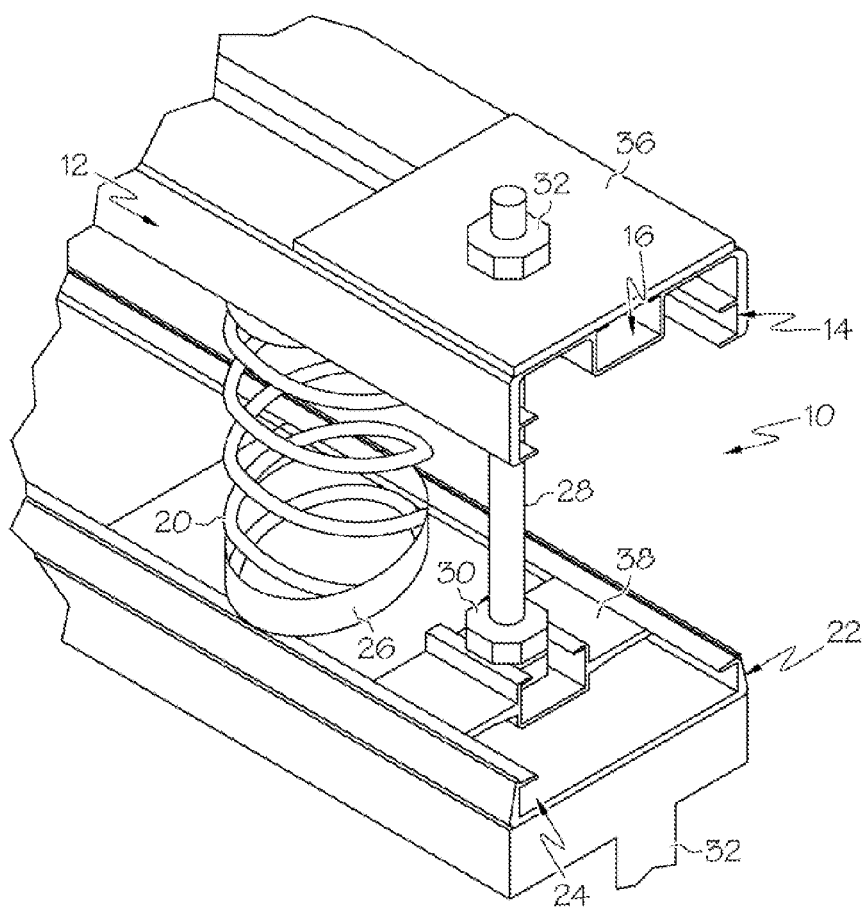
FIG. 2 shows an enlarged, partial cut-away and perspective view of a section of the vibration absorption and dampening system as highlighted in FIG. 1.

FIG. 2 shows a perspective view of the vibration absorption system. As depicted, the vibration absorption system 10 includes a top frame 12 and a bottom frame 22. It is contemplated that the top frame 12 will have a particular shape as shown. Said top frame 12 is contemplated to have a lower elongated channel 14 which will have an open bottom and wrap-around walls to provide support. As further shown, it is contemplated that a second elongated channel 16 may be incorporated into the top frame 12. The second elongated channel 16 has an open top and a u-shaped support. It is contemplated that the top frame 12 will be made of a lightweight material such as aluminum, however, an alternative material may be used.

As further shown, the bottom frame 22 has one elongated channel 24. The elongated channel 24 has an open top and overhanging flanges. It is contemplated that the bottom frame 22 is also constructed of a lightweight material such as aluminum, however, an alternative material may be used. A rubber plate 26 is slidably inserted into the channel 24. The rubber plate 26 has a base which fits into the channel 24, and is geometrically complementary. The rubber plate 26 has an integral receptacle means within, and protruding from, the rubber plate 26. The receptacle means is contemplated to be shaped like a hollow cylinder with an open top, to receive and secure a spring member as further described hereinafter.

Although the plate 26 is stated to be rubber in a preferred embodiment, it is understood that equivalent materials could easily be utilized, such as plastics, composite plastics, hybrid materials and the like.

As further illustrated, a coil spring 20 extends upwardly from rubber plate 26. The bottom end of the coil spring 20 is frictionally fit into the receptacle means of the rubber plates 26, and the components are geometrically compatible. The protruding rim accepts the spring end, retains and secures the spring in correct position between the upper and lower frame members. As shown, the lower frame 22 can be mounted onto an I-frame 32 through the use of nut and bolt devices 34. The I-frame 32 is in turn mounted onto a surface such as a roof or floor.

In a particular application, I-frame or I-beams may not be utilized, and in that case the lower frame member 22 would be mounted directly to the underlying structure, such a rectangular beam, support arm, frame member, flat surface or the like, or simply secured directly to roof or floor.

Bolt 28 is shown connecting the top 12 and bottom 22 frames. A bridge 38 is placed within and extends across the channel 24. The bridge 38 has a further internal channel. The bolt 28 is secured within the internal channel of the bridge 38 at the bottom through one or more nuts 30. Nut 32 secures the bolt 28 to the top frame member 12. It is further contemplated that a planar plate 36 may be used to set across the top of the top frame 12 for more stability and locking the unit in place.

It is important to note that in the primary embodiments, the spring assembly unit 18, 20, and 26, is separate and independent from the bolt assembly and locking unit 28, 30, 32 and 38. The units can be juxtaposed as shown in FIG. 2, or alternatively spaced apart along and within the upper and lower channel frame members. Similarly, any number of spring assembly units and/or bolt assembly units can be utilized between top frame 12 and bottom frame 22, depending upon the weight of load being supported, the size of the unit, etc.

In alternative embodiments, cross-frame members could be utilized, perpendicularly positioned with respect to the frame members shown in FIG. 1, to provide spring assembly units and bolt assembly units around the complete periphery of the unit 40.

Finally, in further alternative embodiments, the bolt assembly and locking unit could be incorporated within the spring assembly unit, and be coaxially positioned therein.

Figure 3:
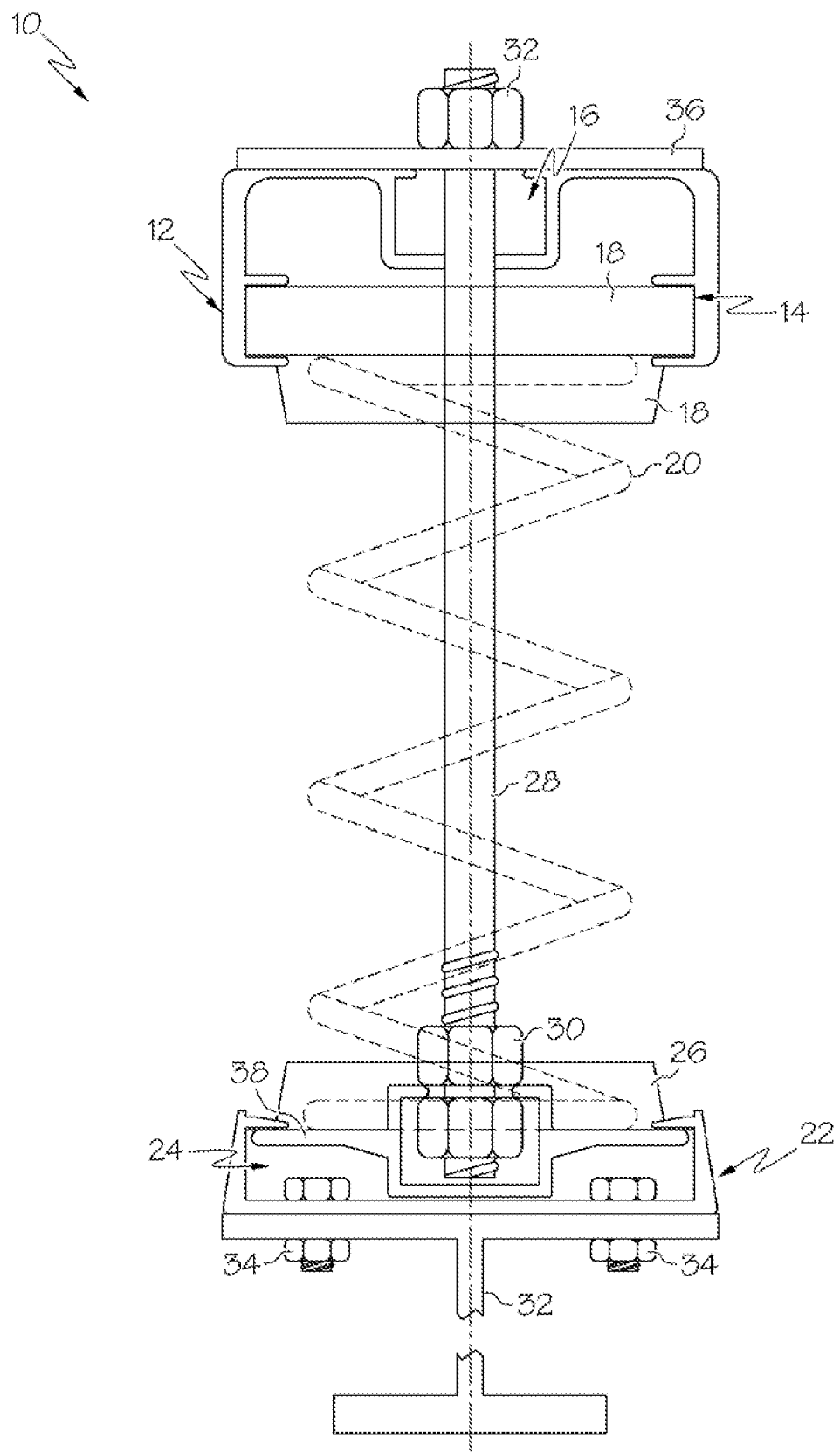
FIG. 3 shows a cross sectional plan view of one embodiment of the spring assembly and frame members, securing mechanism, and components thereof for the motion and vibration absorption and dampening system.

FIG. 3 illustrates a cross sectional plan view of the vibration absorption and dampening system 10. As shown, the vibration absorption system 10 includes a top frame 12 and a bottom frame 22. It is contemplated that the top frame 12 will have a particular geometric shape as shown, to form channels which receive complementary and compatibly shaped components. Said top frame 12 is contemplated to have a lower elongated channel 14 which will have an open bottom and wrap-around walls to provide support. As further shown, it is contemplated that a second elongated channel 16 may be incorporated. The second elongated channel 16 has an open top and a u-shaped support. It is contemplated that the top frame 12 will be made of a lightweight material such as aluminum, however, an alternative material may be used. The spring assembly unit includes rubber plate 18 which is slidably inserted into the lower elongated channel 14. The rubber plate 18 has a flat portion on the top, which slides into the channel 14. The rubber plate 18 additionally has a lower facing portion which is shown to have a tapered appearance, however, alternative shapes are contemplated. The lower portion of the rubber plate 18 is contemplated to have an open receptacle means to receive, retain and secure the spring member 20. The receptacle means can be a generally circular rim which protrudes from the plate to enclose and house one end of the spring member.

As further shown, the bottom frame 22 has one elongated channel 24. The elongated channel 24 has an open top and overhanging flanges. It is contemplated that the bottom frame 22 is also constructed of a lightweight material such as aluminum, however, an alternative material may be used. As shown, a rubber plate 26 is slidably inserted into the channel 24. As with the first rubber plate 18, the second rubber plate 26 has a base which fits into the channel 24. The rubber plate 26 incorporates a receptacle means within, and protruding from, the rubber plate 26. The receptacle means is contemplated to be shaped like a hollow cylinder with an open top, and likewise receives, retains and houses the opposite end of the spring member.

In a primary embodiment as illustrated, a coil spring 20 extends between rubber plate 26 and rubber plate 18. Each end of the coil spring 20 is frictionally fit into the receptacle means of the rubber plates 18, 26. As shown, the lower frame 22 can be mounted onto an I-frame 32 through the use of nut and bolt devices 34. The I-frame 32 is in turn mounted onto a surface such as a roof or floor, depending on a specific application.

As described above and further illustrated, a bolt 28 connects the top 12 and bottom 22 frames. A bridge 38 extends across the lower frame channel 24, the bridge being inserted into the channel. The bridge 38 has an internal channel, as seen in both FIGS. 2 & 3. The bolt 28 is further secured within the internal channel of the bridge 38 at the bottom through one or more nuts 30. Nuts 30, 32 secure the bolt 28 at opposite ends. It is further contemplated that a planar plate 36 may be used to set across the top of the top frame 12 for more stability and also to lock the unit in place. A planar plate may also be used as a locking device to secure the assembly such that it stays securely connected during operation of the air conditioner or other mechanical or electro-mechanical equipment.

In operation, the frame members support the load to the AC units or other commercial, industrial or residential equipment. Particularly with air conditioning units, the equipment is a substantial weight and load, and in operation causes extensive vibration, movement of the unit, housings, walls or internal components, and they are extremely loud creating unwanted and bothersome noise. This phenomena actually causes excessive wear and tear on the equipment itself, as well as the supporting frames, roofs and floors, leading to mechanical and electrical failures.

Applicant's instant inventions and vibration and dampening system acts as a protective interface between the air conditioning unit and the roof, floor or other surface beneath the unit. The instant inventive system dampens and reduces the vibration, movement and noise of the equipment through the placement and use of the spring assemblies and locking units. The system is efficient in that the rubber or composite plates are slid to the desired location within the channel members, and secured in place. The springs support the load, and the equipment essentially "floats" on the upper frame members. The spring assemblies are resilient, and expand or retract with the load. The rubber plates absorb and dampen the vibration and noise, extremely so when comparing to metal on metal assemblies.

The upper frame members are capable of downward movement about the bolts 28, and are limited in downward movement by the spring assemblies. In this manner, static, dynamic and vibrational forces act upon the spring assemblies and are not directly translated to structure beneath the unit as in conventional fashion. The locking assemblies maintain the entire system in correct position and alignment with respect to the upper and lower frame members, and the spring assembles secured within.

The instant invention has been shown and described herein in what is considered to be the most practical and preferred embodiment. It is recognized, however, that departures may be made therefrom within the scope of the invention and that obvious modifications will occur to a person skilled in the alt.

What is claimed is:

1. A vibration absorption system comprising:
   a top frame;
   said top frame having at least one horizontally extending channel;
   a bottom frame;
   said bottom frame having a horizontally extending channel;
   at least one rubber plate slidably inserted into said top frame channel;
   said top frame channel rubber plate having a receptacle means;
   at least one rubber plate slidably inserted into said bottom frame channel;
   said bottom frame channel rubber plate having a receptacle means; and
   at least one coil spring secured between said top frame channel rubber plate receptacle means and said bottom frame channel rubber plate receptacle means.

2. The vibration absorption system described in claim 1 her comprising a second horizontally extending channel in said top frame.

3. The vibration absorption system described in claim 1, wherein said top frame and bottom frame are secured to each other through at least one bolt and nut means.

4. The vibration absorption system described in claim 1, wherein said bottom frame is mounted on top of an I-beam or flat surface.

5. The vibration absorption system described in claim 2, wherein said top frame second horizontally extending channel receives mounting devices located on the base of an air conditioning unit.

6. A vibration absorption system comprising:
   a top frame;
   said top frame having first and second horizontally extending channels;
   a bottom frame;
   said bottom frame having a horizontally extending channel;
   at least one rubber plate slidably inserted into said first top frame channel;
   said top frame channel rubber plate having a receptacle means;
   at least one rubber plate slidably inserted into said bottom frame channel;
   said bottom frame channel rubber plate having a receptacle means; and
   at least one coil spring secured between said top frame channel rubber plate receptacle means and said bottom frame channel rubber plate receptacle means;
   said top frame and bottom frame are secured to each other through at least one bolt and nut means.

7. The vibration absorption system described in claim 6, wherein said bottom frame is mounted on top of an I-beam or flat surface.

8. The vibration absorption system described in claim 6, wherein said top frame second horizontally extending channel receives mounting devices located on the base of an air conditioning unit.

9. A vibration absorption system comprising:
   a top frame;
   said top frame having first and second horizontally extending channels;
   a bottom frame;
   said bottom frame having a horizontally extending channel;
   at least one rubber plate slidably inserted into said first top frame channel;
   said top frame channel rubber plate having a receptacle means;
   at least one rubber plate slidably inserted into said bottom frame channel;
   said bottom frame channel rubber plate having a receptacle means; and
   at least one coil spring secured between said top frame channel rubber plate receptacle means and said bottom frame channel rubber plate receptacle means;
   said top frame and bottom frame are secured to each other through at least one bolt and nut means;
   said bottom frame is mounted on top of an I-beam or flat surface;
   said top frame second horizontally extending channel receives mounting devices located on the base of an air conditioning unit.

* * * * *